March 8, 1960 J. R. DAY 2,927,997

FREQUENCY MODULATION RECEIVER

Filed Jan. 8, 1959

INVENTOR
JAMES R. DAY
BY
Moses, Nolte, & Nolte
ATTORNEYS

United States Patent Office 2,927,997

Patented Mar. 8, 1960

2,927,997

FREQUENCY MODULATION RECEIVER

James R. Day, Peconic, N.Y.

Application January 8, 1959, Serial No. 785,697

16 Claims. (Cl. 250—20)

The present invention concerns a radio receiver and particularly a frequency modulation receiver having means for depressing the threshold of usable received signals, and is a continuation-in-part of my copending application for Frequency Modulation Receiver, Serial No. 725,012, filed March 31, 1958, which has been abandoned.

It is known that frequency modulation receivers suppress static, particularly when the received signal is stronger than the static. The amount of noise at the output of the detector varies inversely with the amplitude of the received signals. It is also known that the limiter of a frequency modulation receiver minimizes the static and other noise. In order for the limiter to function properly and produce output signals of substantially constant amplitude, the received signals must have amplitudes above a certain threshold value. This threshold value is that at which the peak value of the radio signals equals the peak value of the thermal noise. For radio signals of less than this value the limiter is controlled by the larger noise component of its input and the desired signal is correspondingly depressed. In brief, above threshold the desired signal controls the limiter and depresses the noise while below the threshold the situation is reversed. The peak value of the noise, when it is random, and hence the threshold value of the signals, is proportional to the square root of the bandwidth of the receiver.

It is one object of this invention to depress the threshold signal level of a frequency modulation receiver by reducing the effective bandwidth thereof as the received signals approach or fall below the threshold value. This is accomplished by providing the receiver with a wide band channel and a narrow band channel, which are connected to a pair of electron tubes of a combining circuit. The receiver also includes a channel for selecting noise voltages only and rectifying them to produce a biasing voltage applied to the combining tube connected to the wide band channel. The circuit is arranged so that normal reception takes place only through the wide band channel. When the signals fall to the threshold level, the wide band channel combining tube is cut off by the bias voltage, and reception occurs through the narrow band channel, the combining tube connected to the narrow band channel being then made conductive.

The invention shown and described herein was devised to effect an improvement in Tropo-spheric scatter transmissions. As described in my Patents No. 2,835,799 and 2,835,800, such propagation is characterized by nearly continual amplitude fading, which is rapid and occasionally quite deep. The diversity combining systems disclosed in the above mentioned patents generally overcome this obstacle. However, during a certain small percentage of the time in even a well designed diversity system, the signal may be at or below the normal threshold in one or more receiver branches. If it were not for the anomalous effect of threshold breakdown a useful contribution to signal output of the combination could still be made. At threshold there is about 9 db more power in the radio signal than in the noise because the peak to R.M.S. ratio is 3 db for the sinusoidal signal and about 12 db for the random thermal noise. Further there is the effective gain over AM of wide band FM. Thus, just above threshold, the signal to noise ratio at the output of the detector is in most cases still rather good. To have it decrease precipitately just beyond threshold materially affects the percentage of time the combined output signal to noise ratio in a diversity system is better than the prescribed value for the system. By making each branch in the diversity system individually "hang on" to the rapidly fading signal, in the transient-free manner of the circuits disclosed herein is roughly equivalent to increasing the transmitter power by the ratio of the bandwidths of the two branches.

Another object of the invention is to provide a circuit capable of producing threshold reduction in FM reception with the following important advantages. First, the circuit is free of transients and false noise components introduced by the action of the circuit itself. Second, there is no impairment of the receiver itself for signals above threshold, and the main receiving channel for a good signal is nowhere hazarded by variable bandwidth devices which can fail or drift out of adjustment to the detriment of the receiver performance for good signals, which prevail during a major fraction of the time in a well designed system.

The above and other objects and advantages of the invention will be fully understood from the following description and the drawing in which.

Figures 1, 2, 3:
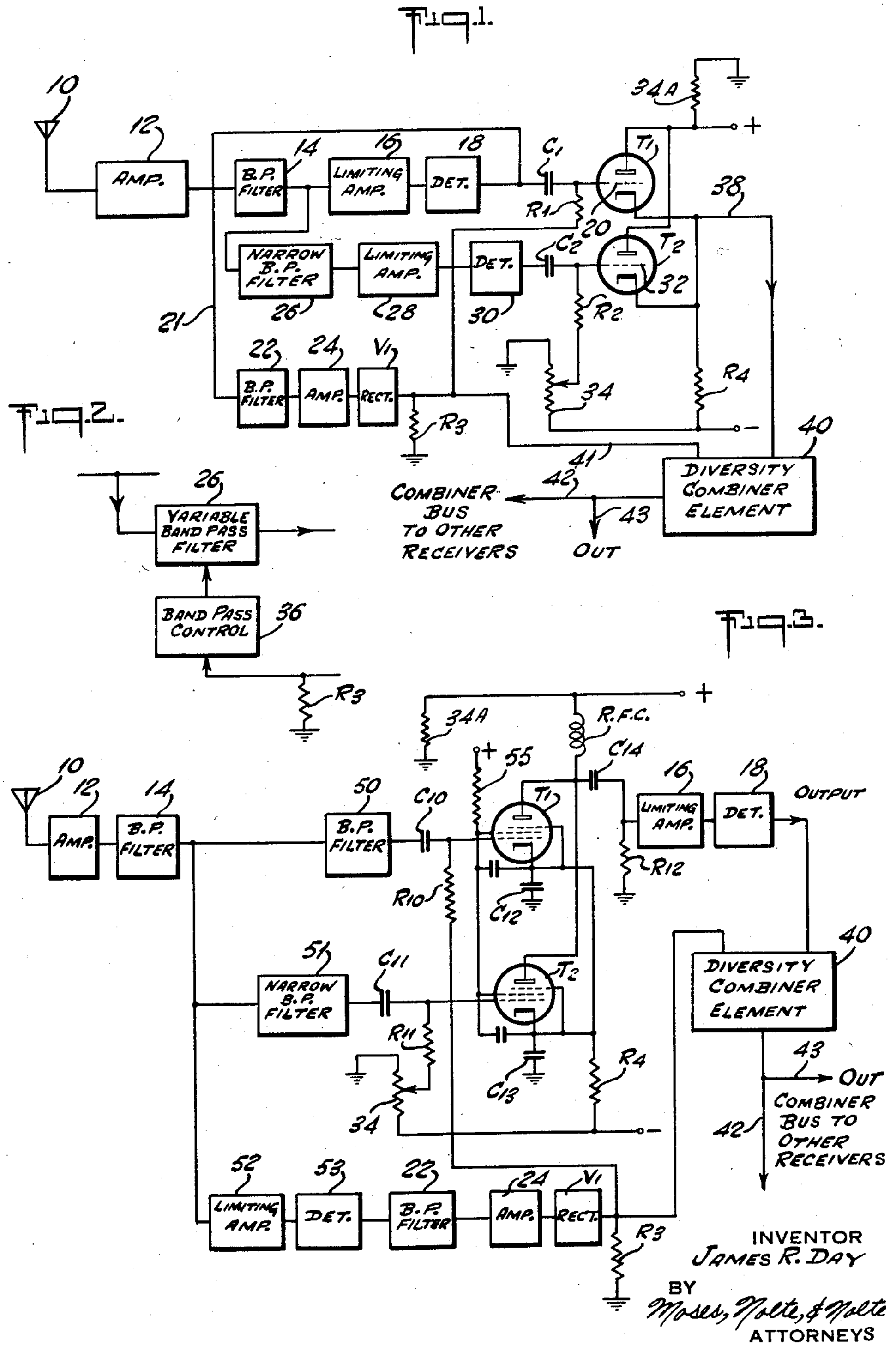
Fig. 1 shows the block diagram of a receiver according to one embodiment of my invention.
Fig. 2 is a block diagram of a controlled variable band pass filter which may be used in the circuit of Fig. 1.
Fig. 3 is a diagram of another embodiment of my invention.

Referring to Fig. 1, the receiver shown therein is a frequency modulation receiver. Signals are obtained from any suitable device such as an antenna 10 and fed to an amplifier or amplifying portion of a receiver 12 which may include a radio frequency amplifier and/or a mixer and an intermediate frequency amplifier. From the amplifying portion 12 the signals are fed through a first band pass filter 14 having a normal bandwidth wide enough to accept the side bands of the modulated carrier signals. The band pass filter 14 is shown here conventionally. In actual practice the band pass effect of the filter will be the net cumulative effect of the various tube interstage circuits involved in amplifier 12, and this net effect will generally have been designed so as to pass the spectrum of the signal with a fidelity consistent with low distortion. The signals are then fed through an amplifier 16 which may include the usual limiters or limiting amplifiers, and thence to a frequency modulation detector 18. The output of the detector is coupled through capacitor C1 to control grid 20 of tube T1.

The output of detector 18 is also fed over connection 21 to a noise sensing band pass filter 22 which may have a pass band preferably below or above the modulation band, so that it will pass noise components only. It is also possible to use noise components within the modulation band if the modulation components are eliminated therefrom. The noise voltages at the output of filter 22 are impressed on an amplifier 24 and then on a rectifier V1 for developing a negative biasing potential across resistor R3 which varies as a function of the input to amplifier 24. This potential is then fed through resistor R1 to grid 20 of tube T1. Thus, the bias of tube T1 will increase with increasing noise, which in turn increases as the received signal voltages decrease. The range of amplitude of bias or control voltage developed is several times the cut off voltage of tube T1. At the signal corresponding to the threshold as defined by filter 14, the control voltage should still be capable of increasing by an amount equal to about twice this cut-off value as the signal decreases still further.

Received signals from the wide band receiving channel 10—18 are also supplied to a band pass filter 26 having a relatively narrow band compared to that of filter 14. The pass band of filter 26 may be the narowest usable band suitable for the type of signals being received. The narrowest usable band may be defined in a practical sense as that value at which the signal distortion due to sideband clipping, rises from the low level characteristic of wide band filter 14, to a value still somewhat less, considered as noise, than the value of the thermal noise characteristic of the radio signal level at the threshold. In the usual practical case, the ratio of the wide to the narrow band may be as great or greater than 10 to 1. The signal output of filter 26 is amplified in amplifier 28 which is provided with either a limiter or a fast acting gain control in order to produce a constant output from detector 30. The frequency modulated signals from amplifier 28 are then detected by any suitable frequency modulation detector 30 and supplied over a capacitor C2 to the control grid 32 of tube T2, which generally is identical to tube T1. It is essential that the polarity of the modulation signals from detectors 18 and 30 be the same and, for minimum distortion, it is important that the amplitudes be approximately the same. Control grid 32 is connected through a resistor R2 to the potentiometer 34 for supplying an adjustable steady bias thereto. The adjustment of potentiometer 34 determines the level at which the output of tube T2 becomes equal to that of tube T1, or in other words, the cross-over of the output characteristics of tube T1 and tube T2.

Filter 26 of the narrow band receiving channel may have a controlled bandwidth varying according to any suitable law including the extreme case of eventual cut-off, by which means a muting action at very low signal levels is obtained. This is indicated in Fig. 2 where the filter 26′ is shown as having a variable bandwidth controlled by a control device 36 which may be responsive to the voltage across resistor R3 and hence to amplitude of the received carrier signals. It is known that the pass band of a filter may be varied in a number of ways, such as by varying the coupling between resonant circuits or by providing damping, etc. Whatever means is used for varying the sharpness of tuning of filter 26′, the adjustment of this means may be suitably controlled by control device 36.

It will be seen that the transfer circuit consisting of tubes T1 and T2 are connected as cathode followers and have a common resistor R4 in the cathode circuit. The demodulated signal output may be obtained at 38 across load resistor R4. The anodes of T1 and T2 are connected to a suitable source of positive potential, the negative terminal of which source is at a negative potential with respect to ground, as fixed by the ratio of resistances 34 and 34A, which is several times the cut-off voltage of the tubes T1 and T2. Typically the source might be 200 volts positive and 100 volts negative. Resistor R4 is chosen of a value such that with the normal current of tube T1 flowing in it the potential of the common cathode connection is about at ground value.

The operation of the circuit described above is as follows. For signals above the threshold value, tube T1 conducts and tube T2 is cut off by the biases provided by potentiometer 34 and resistor R4. The output developed across resistor R4 is, therefore, the normal output obtained from the conventional frequency modulation receiving channel 10—18. Near and below the threshold level, as determined by the amplitude of the increasing D.C. bias voltage from rectifier V1 and by the setting of potentiometer 34, tube T2 begins to conduct and the output of tube T1 decreases. This process proceeds with decreasing amplitudes of the signals below the threshold level until the entire output is derived from the narrow band channel 26—30 and tube T2. It may be noted that the circuits thus function effectively like two receivers each being especially effective for a particular range of amplitudes of received signals.

To provide diversity reception, the output of the receiver on conductor 38 is fed to a diversity combiner element 40. This combiner element may be the combining tube T1 in my Patent 2,835,799. The bias voltage is fed over conductor 41 to combiner element 40. A bus 42 connects combiner element 40 to other combiner elements, corresponding to tube T2 of the above mentioned patent, connected to other receivers in the same manner as the receiver of Fig. 1 is connected to combiner element 40. The output 43 of the several receivers may then be taken from the combiner bus.

Fig. 3 shows a modification of the system of Fig. 1 wherein channel transfer or path transfers occurs before FM detection. Corresponding elements have been given the same reference numerals and the following designated items have the same significance as in Fig. 1: 10, 12, 14, 16, 18, 22, 24, V1, R3, 34, 34A, R4. Up to the output of the generalized band pass amplifier 12, 14, the receiver is the same as in Fig. 1. At this point there are three branches. Taking the lowest first, this is combination of limiter-amplifiers 52 and FM detector 53, similar but not necessarily identical to elements 16 and 18 of Fig. 1. This branch is used solely to derive a noise sensed control voltage and includes elements 22, 24, V1, and R3. Because there are no signal distortion requirements here, elements 52 and 53 may be of simpler and less exacting design than their counterparts 16, 18 in the signal branches.

The other two branches, starting with bandpass filters and/or amplifier stages 50 and 51, are respectively the wide or normal and the narrow band branches. If the wide bandwidth has already been established in elements 12 and 14, then element 50 reduces to a nominal coupling of even greater bandwidth. The capacitors and resistors C10, R10 and C11, R11 as in Fig. 1, are means for coupling the signals to tubes T1 and T2 while applying the necessary control biases. Tubes T1 and T2 are preferably pentodes having screen and suppressor grids with the conventional connections 55 and 56. Capacitors C12 and C13 are RF or IF bypass capacitors and resistor R4 is simply a common cathode bias source rather than an external load as in Fig. 1. Tubes T1 and T2 are connected to a common plate load R12, and the choke RFC and capacitor C14 arrangement is conventional. The potentiometer 34, and resistors 34A and R4 together perform the same function as in Fig. 1.

Diversity reception may be provided by connecting the signal output and noise bias voltage over conductors 38 and 41 to a diversity combiner element 40, as described with reference to Fig. 1. Other receivers and combiner elements similar to those of Fig. 3 are connected to combiner element 40 by bus 42, and the total output of all combiner elements is given at the output connection 43, corresponding to output connection 36 of my Patent 2,835,799.

The operation of the circuit of Fig. 3 is as follows: With large signals above threshold, as defined by the bandwidth of elements 12, 14 and 50, the signal circuit is through tube T1, amplifier 16 and detector 18 to form a normal wide band receiver. At the chosen signal level for channel transfer, as determined by the selected bias and the control voltage developed at resistor R3, tube T1 is cut off and tube T2, previously non-conducting, now conducts. The signal circuit now is via stage 51 and tube T2, with the correspondingly reduced threshold. It is normally desirable that the phase of the signals via tubes T1 and T2 be the same to avoid overly rapid changes in combined amplitude during the short period when both tubes are conducting. Since the tubes are followed by the normal limiter stage 16, constant amplitude during transfer is not vital, although the near zero output which would occur if the phases should be nearly opposite, is an unnecessary handicap for the limiters, and would introduce gratuitous FM distortion. If the phases are kept nearly the same, however, it is practical for the gain of the stage 51 to exceed that of the stage 50 by an amount approximating the threshold reduction, to insure that the limiting amplifier 16 is equally efficacious for the power range of signals utilized by this means of threshold reduction. This gain difference is provided in the design of stages 50 and 51, and in the relative fixed screen and suppressor grid (not shown) biasing of tubes T1 and T2. In the circuit of Fig. 3 there is no requirement for symmetrical performance of tubes T1 and T2.

It should be noted that the invention provides post-detection noise, at frequencies not used for modulation, which is the preferred means of sensing received signal strength for combining control purposes. This is largely so because, in a receiver with truly effective limiting, such sensing is independent of receiver gain variations. In addition it will be found that the range of such sensing extends as far as from 12 to 20 db below normal threshold, and therefore can accurately control the combining right through the critical threshold region. If this sensing is derived from a band above the highest modulating frequency as is preferably the case, in order to get noise bandwidth adequate for the desired speed of action, then its amplitude is dependent on the IF bandwidth. Hence to preserve good combining action this bandwidth should be constant. It would be a serious fault to derive the noise sensing for either or both combining and threshold extension from a receiver branch not having the constant normal (large signal) bandwidth. A common defect of noise sensing means for diversity combining is lack of dynamic range over which the control "law" for optimal ratio combining obtains. This should extend from a value of received signal greater than that at which thermal noise equals intermodulation, to as far below normal threshold as practical. It will be noted that the normal bandwidth branch of Fig. 1 is not disturbed either for above threshold signal or for noise sensing at all signals.

The particular advantages of the circuit of Fig. 1 and of the circuit of Fig. 3 may be understood from a comparison of these circuits. In Fig. 1, the IF signals which are above and below the threshold value are handled in separate amplifier-detector sections 16, 18 and 28, 30, whereas in Fig. 3 stages 16, 18 handle the signals which are above and below normal threshold. The circuit of Fig. 1 thus permits specializing the design of the limiter-detector branch for small signals in ways that might be inimical to the low distortion requirements of the large signal branch. For example, the demodulated output of detector 30 can be held constant by fast automatic gain control applied to amplifier 28, so that some important vestigial use of signals at and below the reduced threshold may be secured. Such "weak signal" systems generally give poor or marginal performance for large signals. In Fig. 3 this opportunity of specializing the design of the limiter-detector circuits is absent and stages 16, 18 must be designed for optimum performance for normal above-threshold signals.

In Fig. 1, the equality of output and phase of detectors 18 and 30 required for good performance during transition in tubes T1 and T2 is a constraint not present in the circuit of Fig. 3 where the opportunity for specialization of design of another sort (increased gain for small signals before limiting) is present without a requirement for equality.

In Fig. 3, the noise sensing control means are independent of the signal path and may be simplified and/or specialized as the case may warrant. In this connection, it is to be noted that the retification of the noise to produce a D.C. control yields a superimposed A.C. component, which may be difficult to minimize by low pass filtering without seriously inhibiting the speed of response of the control means. Thus, for rapid control there will be spurious variations in the value of the control voltage, while for "smooth" control the action will have been slowed down. In the circuit of Fig. 1 the spurious variations in the control voltage may be superimposed to a degree on the demodulated signal during and after the time of transition, when the amplitude of both the D.C. and A.C. parts of the control voltage are large. In Fig. 3, superimposition of such variations are of no consequence because the channel transfer point is located before the point where limiting occurs.

From the above description of my invention, the principles thereof will be apparent to those skilled in the art, and it will be evident that many variations and modifications of my invention utilizing these principles can be made. Therefore, I do not intend that my invention shall be construed as limited except as defined in the following claims.

I claim:

1. A radio frequency receiver comprising means for receiving modulated carrier wave signals, means for amplifying the received signals, a band pass filter connected to said amplifying means having a band width sufficient for receiving the modulated carrier wave, an amplifier connected to said filter and a detector connected to said last mentioned amplifier, a circuit comprising a pair of electron tube cathode followers having a common cathode load resistor, means for connecting the control grid of one of said electron tubes to the output of said detector, means connected to the output of said detector for abstracting at least a portion of the noise voltages of the output of said detector, means for amplifying and rectifying the noise voltages at the output of said noise abstracting means for deriving a negative biasing potential and applying said potential between the grid and the cathode of the first-mentioned electron tube, a second band pass filter having a narrow pass band relative to that of the first-mentioned band pass filter, a second detector connected to the output of the second band pass filter and means connecting the output of said second detector to the control grid of the second electron tube, and means for applying a steady biasing voltage to the control electrode of the second tube.

2. A receiver according to claim 1, wherein said last means is adjustable for biasing said second tube so that its signal output is less than the signal output of the first tube when the received carrier signals have an amplitude greater than a predetermined value and the second tube has a greater signal output than the first tube when the received carrier signals have an amplitude considerably below said predetermined value.

3. A receiver according to claim 1, wherein the noise abstracting means at its input includes a filter having a pass band outside the frequency band of the detected signals, so that the biasing potential is obtained only from noise voltages.

4. A radio frequency receiver comprising means for receiving modulated carrier wave signals, a first receiving channel for said signals having a frequency band width sufficient for receiving the modulated carrier wave and including a detector, a circuit comprising a pair of electron tube cathode followers having a common cathode load resistor, means for connecting the control grid of a first of said electron tubes to the output of said detector, means connected to the output of said detector for abstracting at least a portion of the noise voltages of the output of said detector, means for rectifying said noise voltages for deriving a negative biasing potential and applying said potential between the grid and the cathode of said first electron tube, a second receiving channel having a narrow pass band relative to that of the first receiving channel, said second channel including a second detector connected at the output and means connecting the output of said second detector to the control grid of the second electron tube, and means for applying to the control electrode of the second tube a steady biasing voltage of a magnitude such as to maintain the second tube substantially cut off and the first tube conducting until the input of the receiver falls to a predetermined threshold value.

5. A frequency modulation radio receiver comprising a relatively wide frequency band receiving channel and a relatively narrow frequency band receiving channel each having a limiter and a following frequency modulation detector, a channel transfer circuit comprising a pair of electron tubes having a common load resistor, means for connecting the control grid of each of said electron tubes to the output of each of said detectors, means connected to the wide band channel for abstracting at least a portion of the noise voltages therein, means for rectifying the abstracted noise voltages for deriving a negative biasing potential and applying said potential between the grid and the cathode of a first of said electron tubes, and control means including said load resistor and biasing means for causing the ratio of the portions of the transfer circuit output supplied by the wide band and narrow band channels, respectively, to decrease as the amplitude of the signals at the receiver input decreases.

6. A receiver according to claim 5, wherein said control includes means for applying to the control electrode of the second tube a biasing voltage of such a magnitude that the second tube supplies a lesser signal output to the common load resistor than the first electron tube as long as the received radio signals have a magnitude greater than a predetermined value and the second tube supplies a larger ouput signal than the first tube when the received signals have a magnitude below said predetermined value.

7. A receiver according to claim 5, including means for reducing the bandwidth of the narrow band channel as the amplitude of the received signals decreases.

8. A frequency modulation receiver comprising means for receiving modulated carrier wave signals, a first channel connected to the receiving means and having a bandwidth sufficient for receiving the modulated carrier wave without appreciable distortion, a circuit comprising a pair of electron tubes having a common load circuit, means for connecting a control electrode of one of said electron tubes to the output of said first channel, biasing means connected to said first channel for selecting noise voltage components and rectifying the noise voltages for deriving a negative biasing voltage and applying said biasing voltage to the control electrode of the first-mentioned electron tube, a second channel having a narrow pass band relative to that of the first-mentioned channel, the output of said second channel being connected to a control electrode of the second electron tube, and means for applying a steady biasing voltage to the control electrode of the second tube.

9. A receiver according to claim 8, wherein said last means is adjustable for biasing said second tube so that its signal output is less than the signal output of the first tube when the received carrier signals have an amplitude greater than a predetermined value and so that the second tube has a greater signal output than the first tube when the received carrier signals have an amplitude considerably below said predetermined value.

10. A receiver according to claim 8 wherein the biasing means includes frequency modulation detector and a filter having a pass band outside the frequency band of the detected signals, so that the biasing potential is obtained only from noise voltages.

11. A receiver according to claim 8 wherein said tubes have a common cathode resistor and said load circuit is connected to the anodes of said electron tubes.

12. A receiver according to claim 8, including a limiter and a frequency modulation detector having its input connected to said load circuit.

13. A receiver according to claim 12 wherein the gain of the second channel is greater than the gain of the first channel and sufficient to cause saturation of the limiter when signals below the threshold value are being received.

14. A frequency modulation radio receiving system comprising a relatively wide frequency band receiving channel and a relatively narrow frequency band receiving channel; serially connected limiter means, frequency modulation detecting means and a channel transfer circuit connected to the outputs of said channels; means for abstracting noise voltages; means for rectifying the abstracted noise voltages for deriving a biasing potential; means responsive to said biasing potential for blocking reception through the narrow band channel of received signals having amplitudes above the threshold value and blocking reception through the wide band channel of received signals having amplitudes below the threshold value.

15. A system according to claim 14, including a diversity reception combiner circuit adapted to be connected to a plurality of radio receivers, means for supplying the output of the channel transfer circuit and the biasing potential to the diversity combiner circuit, and means for deriving a signal output from the combiner circuit.

16. A frequency modulation radio receiver comprising a relatively wide frequency band receiving channel and a relatively narrow frequency band receiving channel; serially connected limiter means, frequency modulation detecting means and a channel transfer circuit connected to the outputs of said channels; means for blocking reception through the narrow band channel of received signals having amplitudes above the threshold value and blocking reception through the wide band channel of received signals having amplitudes below the threshold value.

No references cited.